United States Patent [19]

James

[11] Patent Number: 4,681,192

[45] Date of Patent: Jul. 21, 1987

[54] DUAL-WHEEL CASTERS WITH POSITIVE LOCK MECHANISM

[75] Inventor: Michael J. James, Charlton Kings, England

[73] Assignee: Global Castors Limited, Cheltenham, England

[21] Appl. No.: 662,063

[22] Filed: Oct. 18, 1984

[30] Foreign Application Priority Data

Oct. 27, 1983 [GB] United Kingdom ............... 8328767

[51] Int. Cl.$^4$ .............................................. B60B 33/00
[52] U.S. Cl. ..................................... 188/1.12; 188/64; 16/35 R
[58] Field of Search ................ 188/1.12, 31, 60, 69; 16/35 R; 403/289, 381, 354, 71; 74/519; 29/453; 384/273, 281

[56] References Cited

U.S. PATENT DOCUMENTS

| | | | |
|---|---|---|---|
| 434,295 | 8/1890 | Richardi | 403/289 X |
| 4,333,207 | 6/1982 | Atwood | 188/1.12 X |
| 4,350,360 | 9/1982 | Olsson et al. | 403/289 X |

Primary Examiner—Duane A. Reger
Assistant Examiner—M. C. Graham
Attorney, Agent, or Firm—Allison C. Collard

[57] ABSTRACT

A braked twin-wheel caster assembly consists of five components—a body, two indentical wheels, a metal wheel spindle and a locking lever. A molded brake lever, rockable between a wheel-locking position and an unlocking position in which the wheels are free to turn, has an intermediate mounting portion which pivots in a bearing recess in the moulded body. The bearing recess is disposed towards the trailing end of the body, and it is open at an outer aperture and also at an inner aperture. An outer end portion of the locking lever projects through the outer aperture to provide an operating member for external operation. An inner end portion of the locking lever projects from said inner aperture to provide a locking member for engagement with the caster wheels. The intermediate portion of the locking lever is molded so that it can be resiliently compressed sufficiently for it to be inserted into the bearing recess through the outer aperture.

6 Claims, 11 Drawing Figures

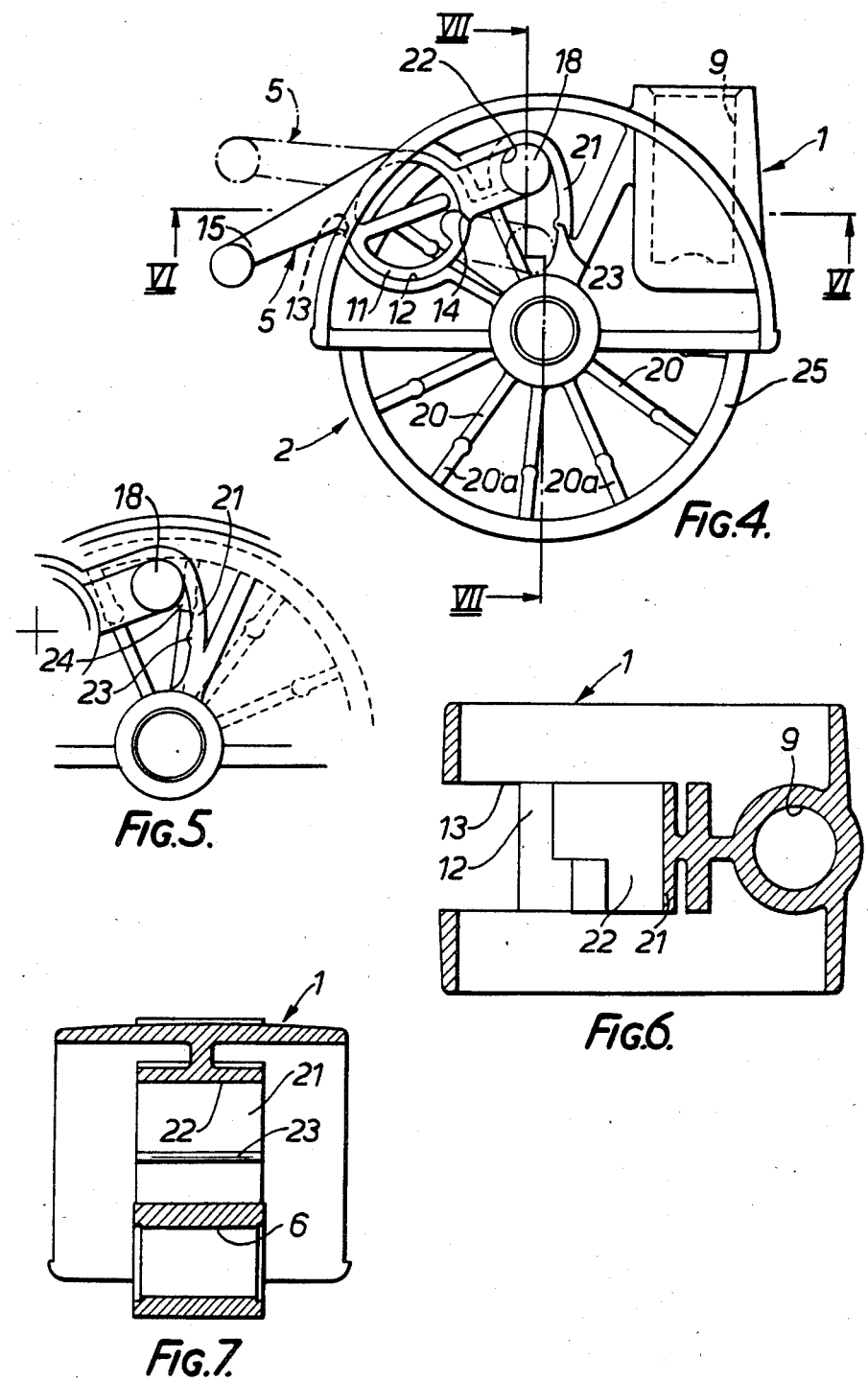

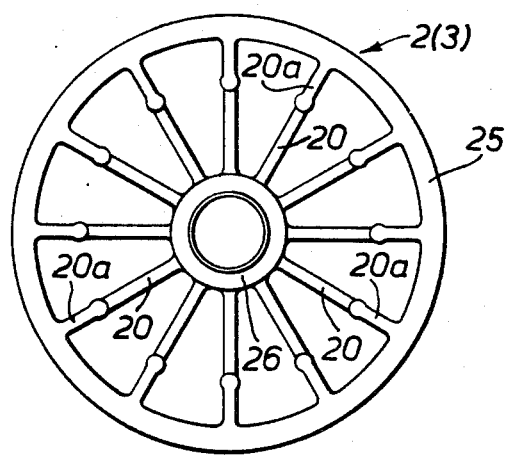
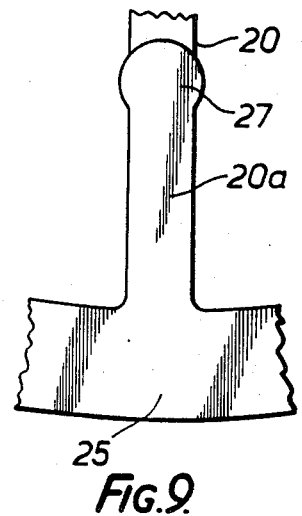
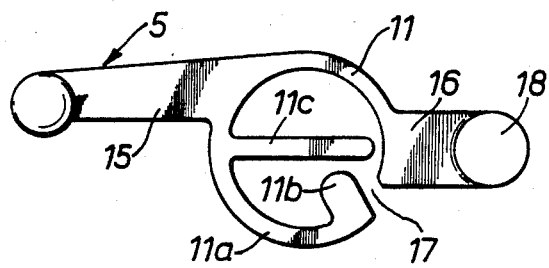
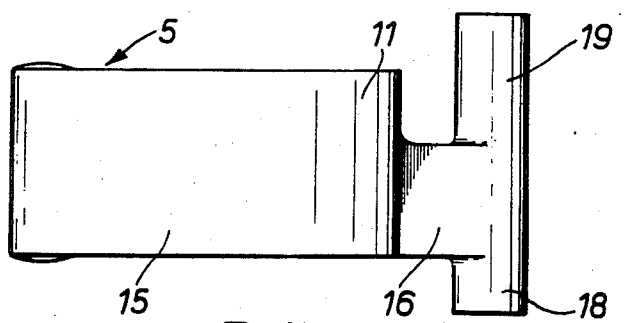

DUAL-WHEEL CASTERS WITH POSITIVE LOCK MECHANISM

BACKGROUND OF THE INVENTION

1. Field of the Invention

The invention relates to casters, and is in particular concerned with twin-wheel casters embodying externally-operable brake means comprising a brake member which engages the caster wheels internally to lock them against rotation.

2. Description of the Prior Art

Various constructions of braked twin-wheel caster have been proposed, with a projecting operating member mounted in the body of the caster and which is either axially movable (as for example in UK Patents Nos. 2,054,070 and 2,074,024) or is rockable or pivotally mounted (as for example in UK Patents Nos. 2,074,024 and 2,090,637). All these constructions suffer from the disadvantage that separate elements of the brake means have to be fitted from the inner side of the caster body prior to fitting the wheels, these elements being at least the brake member which engages the wheels and commonly also other elements such as a return spring. This considerably complicates the assembly of the caster as compared with a similar 'non-braked' caster without a braking mechanism, particularly when both "braked" and "non-braked" casters have to be assembled on the same assembly line.

Prior constructions in which locking projections of a lever engage between radial ribs or webs in identical wheels possess the disadvantage that an applied moment tending to rotate a locked wheel can apply a force to the lever which may displace it from the locking position.

The prior UK Pat. No. 2,090,637 referred to discloses a braked caster with a two-component member in the form of a pivotally-mounted lever which projects from the body and provides both the locking member and the operating member. A locking pin which projects laterally adjacent the inner end of the lever engages for locking purposes between internal ribs or webs in the wheels. This construction reduces the number of separate parts required and the main portion of the lever can be fitted from outside the caster, but it is still necessary to fit both the locking pin and a pivot pin mounting the lever from within the body, and thus before both caster wheels have been fitted.

SUMMARY OF THE INVENTION

The main object of the invention is to provide a caster with brake means which are fitted in a simple manner entirely from outside the caster body, and thus which can be fitted after the rest of the caster has been assembled.

Another object of the invention to provide a braked twin-wheel caster which can be designed such that an applied moment tending to rotate a locked wheel cannot apply a force to the locking lever which may displace it from the locked position, without the wheels having to be 'handed'.

A further object of the invention is to provide a lockable caster with a single lever providing both the locking member and the operating member, wherein these members are formed as a single component and other separately fitted parts such as a pivot pin are not required.

According to the invention a twin-wheel caster has a locking lever rockably mounted in a bearing recess molded in a body of the caster and open at outer and inner apertures through which the two ends of the lever respectively project, on the outer side as an operating member for external operation of the lever and on the inner side for engagement as a locking member with the wheels of the caster, said lever having an intermediate mounting portion which takes a pivotal bearing in said recess and which is resiliently compressible to a size such that it can be fitted into said recess through said outer aperture.

Preferably said lever is a plastics molding with said mounting portion of hollow cylindrical form and axially split to provide the required compressibility at right angles to the pivot axis. Preferably the lever has oppositely directed and laterally projecting inner end stubs for locking engagement between peripheral ribs or webs molded internally of the wheels. To facilitate insertion of the locking stubs through the apertures and the bearing recess during fitting of the lever they may be disposed at the end of a reduced width section of the lever which is laterally offset from the center line thereof. This enables the span of the stubs to be greater than the width of the recess, during assembly the lever being 'angled' into position through the bearing recess.

The body may be molded internally with rounded detent projections beyond which the locking stubs snap into the locking and unlocking positions in which they are then retained. Instead of the locking detent projection the body may be molded with a recess in which one of the stubs is tightly received for retention in the locking position, and this also assists in supporting the lever against reaction forces from the locked wheels.

Preferably the wheels are a snap-on fit on a metal spindle which is fixed in the body, thus providing a caster which consists of only five components—the body, two wheels, the spindle and the locking lever. A twin-wheel braked caster with this small number of parts, and the resultant decrease in manufacturing cost, has not previously been achieved. The body may be designed so that the same tool, with interchangeable cores, can be used to mold the body either with said outer aperture or without it according to whether the body is to be assembled in a braked or unbraked caster. The assembly of the two types of caster can then be identical with handling of similar parts, apart from the final step of fitting the brake lever in the case of a braked caster.

Other preferred features of the invention will be apparent from the following description, drawings and claims, the scope of the invention not being limited to the drawings themselves as the drawings are only for the purpose of illustrating a way in which the principles of the invention can be applied. Other embodiments of the invention utilizing the same or equivalent principles may be used and structural changes may be made as desired by those skilled in the art without departing from the present invention and the purview of the appended claims.

BRIEF DESCRIPTION OF THE DRAWINGS

FIG. 4 is an opposite side view with a wheel of the caster removed;

FIG. 5 is a similar partial view illustrating a modification;

FIGS. 6 and 7 respectively sectional views of a body component of the caster on the lines VI—VI and VII—VII in FIG. 4;

FIG. 8 illustrates a wheel component of the caster viewed from the inner side;

FIG. 9 is a detail of FIG. 8 to a larger scale; and

FIG. 10 and 11 are detail larger-scale views of a brake lever component of the caster.

DESCRIPTION OF THE PREFERRED EMBODIMENT

Figure 1:
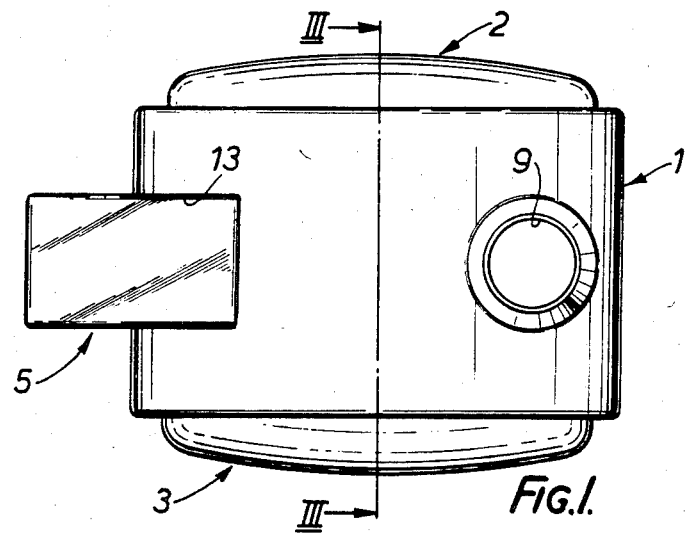
FIG. 1 is a top plan view of a braked twin-wheel caster representing a preferred embodiment of the invention.
Figure 2:
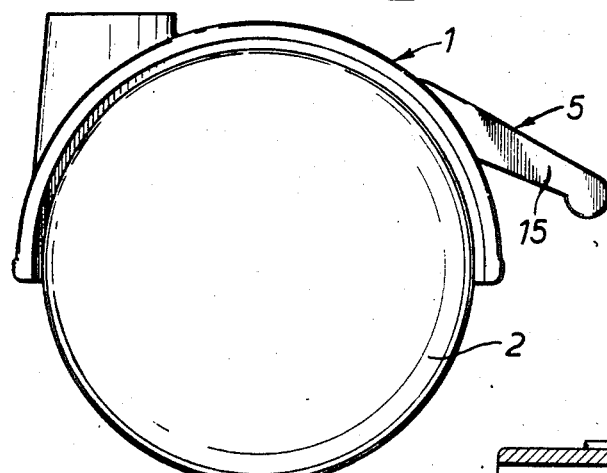
FIG. 2 is a side view thereof.
Figure 3:
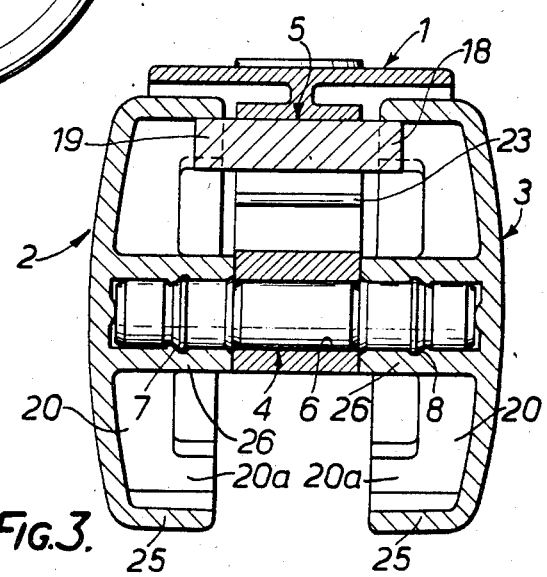
FIG. 3 is a sectional view on the line III—III in FIG. 1.

The caster assembly illustrated consists of five components—a body 1, two identical wheels 2 and 3, a metal wheel spindle 4 and a locking lever 5. With the exception of the spindle 4 all these components are plastics moldings. A central portion of the spindle 4 is a tight fit in a through bore 6 in the body 1, and the wheels 2 and 3 are a free running fit on the corresponding projecting ends of the spindle 4. The wheels 2 and 3 are a snap-on fit on the spindle 4, being retained thereon by respective interengaging lip/groove formations at 7 and 8. The body 1 has an upwardly-open blind mounting bore 9 by which it can be pivotally mounted, in conventional manner, on a fixing spindle below an article to be supported by the caster, for example an item of furniture.

The present invention is concerned with the brake means embodied in the caster which will now be further described with particular reference to the construction and operation of such means. The brake lever 5 is rockable between the wheel-locking position illustrated in full lines and the unlocking position shown partially in broken lines in FIG. 4 in which the wheels are free to turn. The lever 5 is shown in detail in FIGS. 10 and 11 and it has an intermediate mounting portion 11 which takes a pivotal bearing in a part-cylindrical bearing recess 12 in the body molding 1. This recess 12 is disposed towards the rear or trailing end of the body, that is towards the end remote from the mounting spindle bore 9, and it is open at an outer aperture 13 and an inner aperture 14. The lever 5 has an outer end portion 15 which projects from the intermediate portion 11 through the outer aperture 13 to provide an operating member for external operation of the locking means, conveniently being foot operated. An inner end portion 16 of the lever 5 projects from the mounting portion 11 through the inner aperture 14 to provide a locking member for engagement with the wheels 2 and 3 as will be described.

The intermediate portion 11 of the lever 5 is molded as a hollow cylinder with an axial split 17 immediately below the inner portion 16, this split 17 being of adequate width to allow the portion 11 to be compressed at right angles to the pivot axis in the plane of the drawing sufficiently for it to be inserted into, the bearing recess 12 through the outer aperture 13. The free flexible section 11a of the portion 11 (FIG. 10) has an inwardly projecting end protuberance 11b which engages an internal web 11c cantilevered from the cylindrical wall of the portion 11 in order to limit the compressibility of the portion 11. This acts to prevent the application of an excessive operating force to the outer portion 15 springing the lever 5 out of the recess 12.

Laterally projecting stubs 18 and 19 at the inner end of the lever 5 engage between adjacent internal webs such as 20 at the periphery of the wheels 2 and 3 in order to lock the wheels against rotation. As the lever 5 moves between the unlocking and locking positions it slides along an arcuate portion of an internal web 21 within the body 1. At the upper end this portion terminates at a recess 22 in which the stub 19 is closely received to retain the lever 5 in the locking position. Towards its lower end the web 21 has a radiused detent projection 23 over which stubs 18 and 19 snap to retain the lever 5 in the unlocking position.

In the modification of FIG. 5 the retaining recess 22 is omitted and instead the web 21 has a second detent projection. This functions in the same manner as the projection 23, except that it functions to retain the lever 5 in the locking position.

Between the intermediate mounting portion 11 and the stubs 18 and 19 the inner end portion 16 of the lever 5 is of reduced width offset laterally of the center line of the lever. This permits the stubs 18 and 19, the ends of which project equally at the sides of the lever 5, to be threaded through the apertures 13 and 14 with the lever 5 appropriately angled during fitting of the lever 5 into the body 1. This enables the lever 5 to be the last of the caster components fitted, as the lever can be inserted in this manner from outside the body after the spindle 4 and the wheels 2 and 3 have been fitted.

As shown particularly in FIG. 9 each wheel 2 or 3 has twelve equally spaced webs 20. The webs 20 extend from a peripheral rolling rim 25 of the wheel to a central mounting boss 26 which fits on the spindle 4. Over a radially outer portion 20a each web extends for the full axial width of the wheel 2 or 3, and it is between such portions that the lever stubs 18 and 19 engage in the wheel-locking position. Inwardly of the portions 20a the webs 20 are cut away to provide clearance for the stubs 18 and 19 when in the unlocking position.

FIGS. 8 and 9 show in detail an important feature of the preferred embodiment, namely the formation of each radial web portion 20a with an increased thickness and axially extending edge bead 27 of part-spherical cross-section. These beads prevent an external turning moment applied to the locked wheels resulting in a reaction force at the stubs 18 and 19 which might move the lever 5 out of the locked position as can happen when the engaged web portions have a plain radial engaged surface as with known braked casters. Thus the caster remains securely braked against external forces tending to move it.

I claim:

1. A twin-wheel caster comprising a body having a bearing recess molded therein, two wheels rotatably mounted on opposite sides of said body for rotation about a common axis, and a locking lever mounted in said bearing recess for rocking movement about an axis disposed parallel to said wheel rotation axis, said recess being open at outer and inner side apertures which are opposed laterally of said rocking movement axis and through which opposite inner and outer ends of said lever respectively project, said outer end of the lever projecting as an operating member for external operation of the lever and said inner end of the lever projecting for engagement as a locking member with said wheels of the caster, said lever having an intermediate mounting portion which takes a pivotal bearing in said bearing recess and which is resiliently compressible to a size such that it can be fitted into said recess through said outer side aperture by lengthwise insertion of said lever into said body laterally of said rocking movement axis and through said apertures, and said intermediate portion of the lever when uncompressed being larger laterally of said rocking movement axis than the corresponding dimension of either one of said apertures so that said intermediate portion is retained captive within the bearing recess.

2. A twin-wheel caster according to claim 1, wherein said lever is a molded of resilient flexible plastic material with said mounting portion being of hollow cylindrical form and axially split throughout its axial length to provide the required compressibility at right angles to the pivot axis.

3. A twin-wheel caster according to claim 1, wherein said body of the caster is molded with a further recess in which one of said inner end stubs of the locking lever is tightly received for retention in the locking position, and to assist in support of the lever against reaction forces from the locked wheels.

4. A twin-wheel caster according to claim 1, wherein the wheels are a snap-on fit on a metal spindle which is fixed in said body of the caster, and the caster consists of only five components—said body, said two wheels, said spindle and said locking lever.

5. A twin-wheel caster according to claim 3, wherein said perpheral ribs or webs molded internally of the wheels are disposed radially thereof, with each such rib or web being formed at the radially inner edge thereof with an increased thickness and axially extending bead which is of generally part-spherical cross-section.

6. A twin-wheel caster according to claim 1, wherein the locking lever has oppositely directed and laterally projecting inner end stubs for locking engagement between peripheral ribs molded internally of the wheels, said inner end stubs having an overall span greater than the width of said recess and being disposed at the end of a reduced width section of the lever, said reduced width section of the lever being laterally offset from the center line of the lever thereby allowing the lever to be angled into fitted position through said bearing recess.

* * * * *